(12) United States Patent
Davis et al.

(10) Patent No.: US 8,477,154 B2
(45) Date of Patent: Jul. 2, 2013

(54) METHOD AND SYSTEM FOR INTERACTIVE VIRTUAL INSPECTION OF MODELED OBJECTS

(75) Inventors: Fredrick M. Davis, Orlando, FL (US); Yakup Genc, Dayton, NJ (US); Sergey Kabanov, Cranbury, NJ (US); Robert E. Shannon, Oviedo, FL (US); Xiang Zhang, Cranbury, NJ (US)

(73) Assignee: Siemens Energy, Inc., Orlando, FL (US)

( * ) Notice: Subject to any disclaimer, the term of this patent is extended or adjusted under 35 U.S.C. 154(b) by 1053 days.

(21) Appl. No.: 11/875,092

(22) Filed: Oct. 19, 2007

(65) Prior Publication Data
US 2008/0247636 A1 Oct. 9, 2008

Related U.S. Application Data

(63) Continuation-in-part of application No. 11/455,523, filed on Jun. 19, 2006, now Pat. No. 7,689,003.

(60) Provisional application No. 60/853,482, filed on Oct. 20, 2006, provisional application No. 60/853,483, filed on Oct. 20, 2006, provisional application No. 60/853,485, filed on Oct. 20, 2006.

(51) Int. Cl.
*G09G 5/00* (2006.01)
(52) U.S. Cl.
USPC ............ 345/653; 345/650; 345/419; 715/757
(58) Field of Classification Search
USPC ........... 382/152; 715/848, 230, 838; 345/421, 345/419
See application file for complete search history.

(56) References Cited

U.S. PATENT DOCUMENTS

| 5,825,908 | A | * | 10/1998 | Pieper et al. .................. 382/131 |
| 6,522,993 | B1 | | 2/2003 | Tomko |
| 6,813,035 | B2 | | 11/2004 | Hoffmann |
| 7,107,278 | B1 | * | 9/2006 | Bandemer ............................. 1/1 |
| 7,660,464 | B1 | * | 2/2010 | Peterson ....................... 382/181 |
| 7,698,110 | B2 | * | 4/2010 | Connor et al. .................... 703/1 |
| 2005/0030525 | A1 | | 2/2005 | Forster et al. |
| 2005/0068544 | A1 | | 3/2005 | Doemens et al. |
| 2005/0238206 | A1 | | 10/2005 | Doemens et al. |

(Continued)

FOREIGN PATENT DOCUMENTS

| EP | 0 970 435 B1 | 1/2000 |
| WO | WO 2005/080916 A1 | 9/2005 |

OTHER PUBLICATIONS

Jennifer Simpson et al., Annotate Image gallery (Jan. 8, 2004), http://www.sci.utah.edu/~simpson/documentation/projects/annotation/webdocs/image_gal.html.*

(Continued)

*Primary Examiner* — Ramsey Refai
*Assistant Examiner* — Di Xiao

(57) ABSTRACT

A method of using a Graphic User Interface (GUI) for interactive virtual inspection of modeled objects. The method includes acquiring a three-dimensional model of a modeled object and displaying a first view of the modeled object for a user to identify locations of interest on a surface of the modeled object visible within the first view. The user enters information to create a markup tag that annotates the location of interest, and the markup tag is automatically associated with the location of interest on the modeled object. A second view of the modeled object is displayed including the user identified location of interest and the markup tag.

19 Claims, 7 Drawing Sheets

U.S. PATENT DOCUMENTS

| | | | |
|---|---|---|---|
| 2005/0289472 A1* | 12/2005 | Morita et al. | 715/757 |
| 2006/0066609 A1* | 3/2006 | Iodice et al. | 345/419 |
| 2006/0098212 A1 | 5/2006 | Forster et al. | |
| 2007/0217672 A1 | 9/2007 | Shannon et al. | |

OTHER PUBLICATIONS

Kadobayashi et al., 3D Viewpoint-based Photo Search and Information Browsing, (2005) http://delivery.acm.org/10.1145/1080000/1076158/p621-kadobayashi.pdf?key1=1076158&key2=8044030031&coll=DL&dl=ACM&ip=151.207.242.4&CFID=12654443&CFTOKEN=85254027.*

David Harrington et al. (hereinafter Harrington), Inside AutoCAD 2002, Publisher Que (2001).*

Rob Slapikoff, The ABC's of Using the ACL, (Apr. 1, 1998) http://www.ibm.com/developerworks/lotus/library/ls-Using_the_ACL/index.html.*

Abstract Dimensions, Histogram (1998), http://www.psptips.com/4/basics/hist.html.*

Parametric Technology (herein Parametric), Markup Mode, (1998), http://silverstone.fortunecity.com/daytona/344/proehelp/drawings/14_markup.htm.*

"Spatial Integrated Systems," "3DIS", "Revolutionary Digital 3D Image and Data Capture System," "Model 1500"; [online]; [retrieved Feb. 23, 2006]; 2 pages; Retrieved from http://www.sisinc.org/pring.asp?id=12; Spatial Integrated Systems, Inc., Rockville, MD.

* cited by examiner

METHOD AND SYSTEM FOR INTERACTIVE VIRTUAL INSPECTION OF MODELED OBJECTS

CROSS-REFERENCE TO RELATED APPLICATIONS

This application is a continuation-in-part of and claims priority to U.S. patent application Ser. No. 11/455,523 filed Jun. 19, 2006 which claims priority to U.S. Provisional Patent Application Ser. No. 60/784,106, filed Mar. 20, 2006. This application claims priority to U.S. Provisional Patent Application Ser. Nos. 60/853,482, 60/853,483 and 60/853,485, all filed Oct. 20, 2006. All of the above applications are herein incorporated by reference in their entirety as if fully set forth herein.

FIELD OF THE INVENTION

This invention relates generally to the field of nondestructive evaluation of objects, and more particularly, to computer aided inspection of objects based on processing of acquired images of the object.

BACKGROUND OF THE INVENTION

A wide variety of nondestructive techniques are used to gather data and to provide condition assessment reports for industrial components. Standards for such examinations are defined by organizations such as the American Society for Nondestructive Testing (ASNT), the American Society for Testing of Materials (ASTM), the American Society for Mechanical Engineering (ASME), the American Welding Society (AWS), the International Standards Organization (ISO) and other national and international entities. Nondestructive examination techniques are available for the inspection of surface conditions (e.g. dimensional measurement and visual inspection), for the inspection of near-surface and surface-opening conditions (e.g. dye penetrant test, magnetic particle test and thermography), and depending upon the material of construction of the component, for full volumetric inspection (e.g. eddy current test, ultrasonic test, radiographic test).

Experience shows that a majority of the information and data available for diagnostics and prognostics, and the data most directly relatable to the assessment of component condition, comes from visual inspections and dimensional measurements. There may be over one hundred visual examinations and inspections required during the manufacturing and service life of a typical gas turbine component, for example.

To augment traditional manual visual inspections, it is known to utilize the capabilities of modern optical imaging devices together with computers and software in systems often referred to as aided visual inspections.

SUMMARY OF THE INVENTION

In accordance with one aspect of the invention, a method of using a Graphic User Interface (GUI) for interactive virtual inspection of modeled objects comprising acquiring a three-dimensional model of a modeled object; displaying a first view of the modeled object; identifying by a user, a location of interest on a surface of the modeled object that is visible within the first view; creating a markup tag having information entered by the user that annotates the location of interest; automatically associating the markup tag with the location of interest on the modeled object; displaying a second view of the modeled object having at least one image point that correlates to the user identified location of interest on the modeled object; and conveying the markup tag to the second view of the modeled object.

In accordance with another aspect of the invention, a system for interactive virtual inspection of modeled objects is provided comprising a processor, a display device coupled to the processor, a memory device, and program code resident in the memory device, the program code executable by the processor to run a graphic user interface (GUI) for analyzing modeled objects. The GUI for analyzing modeled objects comprises an acquisition module configured to acquire a three-dimensional model of a modeled object, a display module configured to display views of the modeled object on the display, wherein a user interacting with the graphic user interface selects a first view of the modeled object for viewing on the display, a processing module configured to identify a location of interest on a surface of the modeled object that is visible within the first view and to designate global coordinate points of the three-dimensional model that characterize the location of interest of the modeled object and an inspection module configured to create a markup tag, wherein the user interacts with the markup tag to provide information that annotates the location of interest, wherein the processing module associates the markup tag with the designated global coordinate points of the three-dimensional model. Upon the user selecting a second view of the modeled object that has at least one image point that correlates to a corresponding designated global coordinate point of the three-dimensional model that characterize the location of interest for display by the display module, the processing module conveys the markup tag so that the user may also view the information included in the markup tag.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof and in which is shown by way of illustration, and not by way of limitation, a specific preferred embodiment in which the invention may be practiced. It is to be understood that other embodiments may be utilized and that changes may be made without departing from the spirit and scope of the present invention.

According to various aspects of the present invention, a three-dimensional (3D) model of an object of interest also referred to herein as a virtual object, is utilized for inspection and analysis. An operator interacts with the virtual object by examining, manipulating or otherwise evaluating one or more two-dimensional (2D) and/or three-dimensional (3D) views of the virtual object in a graphic environment. During the inspection, the operator may define locations on the virtual object and associate markup tags and other electronically recorded information with the defined locations. As the operator changes views of the virtual object and/or adds markups to defined locations of interest, the collected information is coalesced in a manner that associates the markup information to the 3D model. As such, the operator may identify a location of interest in a particular 2D or 3D view, which may correspond to a specific feature, region, area or other aspect of the virtual object and associate a markup, e.g., annotation, tag, metadata, etc., with the specifically identified location. In practice, multiple views of the virtual object may reveal a previously considered and marked up location of interest. However, entered markup information is automatically conveyed to each view of the virtual object where the location of interest is visible. As such, the previously recorded inspection results including the markup of the location of interest revealed in a previously considered view is conveyed to the operator as the operator changes views that also show previously marked up locations of interest.

Figure 1:
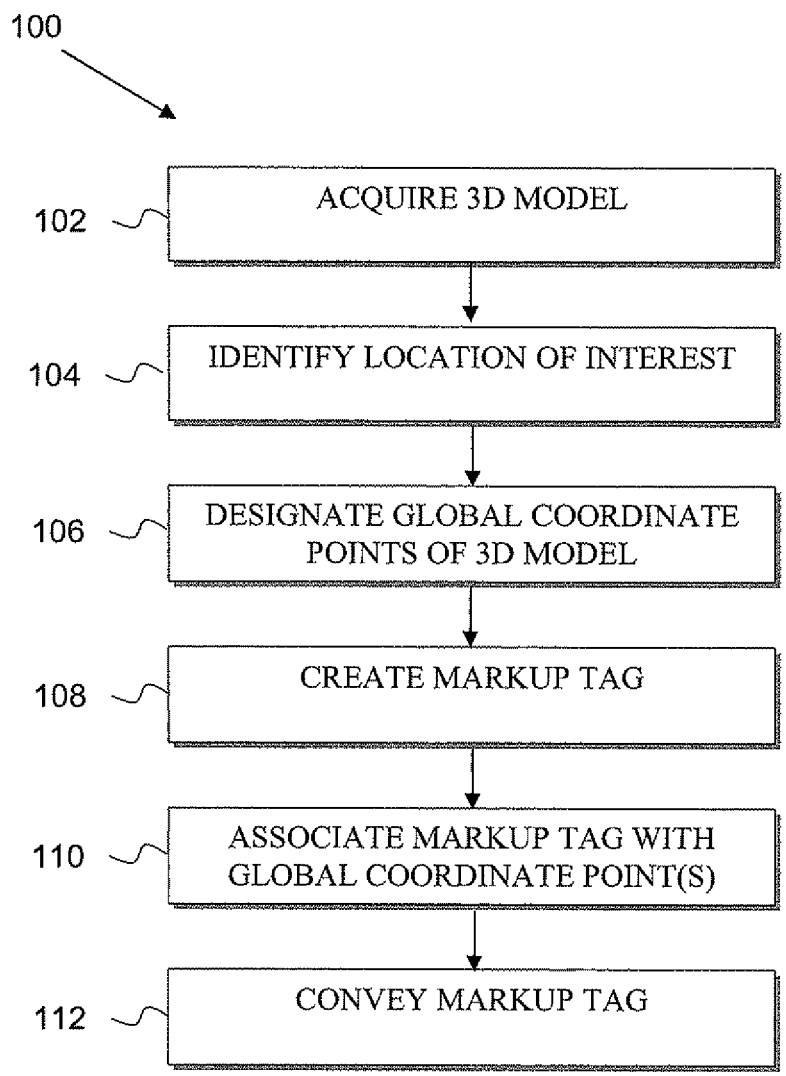
FIG. 1 is a flow diagram illustrating a method for coalescing information collected during inspection of a virtual object.

With reference to FIG. 1, a method 100 is illustrated for coalescing information collected during inspection of a virtual object. An image set of an object to be inspected is acquired at 102. The image set may comprise, for example, a 3D model of the object and optionally, a plurality of image files such as high resolution 2D image files of the object. The 3D model in the image set may be generated from data obtained by a suitable inspection apparatus, such as the apparatus designated by the reference numeral 10 as described in U.S. patent application Ser. No. 11/455,523, which is incorporated by reference herein. As an example, the inspection apparatus may utilize a digital photography apparatus and a 3D dimensional measurement element such as a structured light panoramic scanner, an example of which is also described in U.S. patent application Ser. No. 10/950,219, which is also hereby incorporated by reference herein.

The 3D model may thus be conceptualized as a virtual 3D image (virtual object) of a corresponding real object that may reveal features or other characteristics of the real object that may be of interest, e.g., to identify degradations, defects and other conditions observable or otherwise manipulated to become detectable as described more fully herein.

The image files may comprise high resolution images generated while scanning the object to be inspected for purposes of creating the corresponding 3D model. The 3D model may also be created from or otherwise revised by the images, such as by using stitching techniques to assemble the images into the 3D model. For example, a plurality of high resolution 2D images of an object to be inspected may be captured from a number of different views of the object that are adequate to cover all surfaces of the object. The image files may include digital color photographs and/or black-and-white images illuminated on the same surface using three or more known colors in such a way that the multiple colors can be processed to produce digital color photographs, etc. However, image files within the image set may alternatively derive from other sources, such as thermal scans of the object, florescence evaluations of the object, x-ray scans of the object, etc.

A location of interest on a surface of the modeled object is identified at 104. The location of interest may be determined by an inspection of either the 3D model or of any of the image files of the associated image set, e.g., to identify a feature of interest. Global coordinate points of the 3D model are designated at 106 that characterize the location of interest of the modeled object that was identified at 104. Also, a markup tag of user-defined information is created at 108 that annotates the location of interest as will be described in greater detail herein. The markup tag is associated with the designated global coordinate points of the 3D model at 110 and the markup tag is conveyed at 112 when viewing either the 3D model or any one of the image files of the image set that has at least one image point that correlates to a corresponding designated global coordinate point of the 3D model.

Thus, for example, a markup of a feature created by a user when working with a first view of the virtual object may be automatically conveyed to alternate views that also encompass that feature or a portion thereof. In this regard, when working with a second view that contains a previously marked up feature, the user may elect to hide or view the conveyed markup.

According to aspects of the present invention, the ability to automatically convey markups among multiple views of a virtual object is facilitated by mapping image points of image files from an image set to corresponding global coordinate points on the associated 3D model. By mapping image points to corresponding global coordinate points of the associated 3D model for example, visual inspection data such as markup tags, etc., generated during the inspection of 2D optical images may be mapped to corresponding 3D surface position data of the 3D model. This arrangement allows bi-directional mapping of position information, i.e., from a 2D image file to the associated 3D model, or from the 3D model to one or more 2D image files. As such, collected inspection information, e.g., markup tags etc. collected from multiple views may be coalesced with a digital 3D model of an object.

Figure 2:
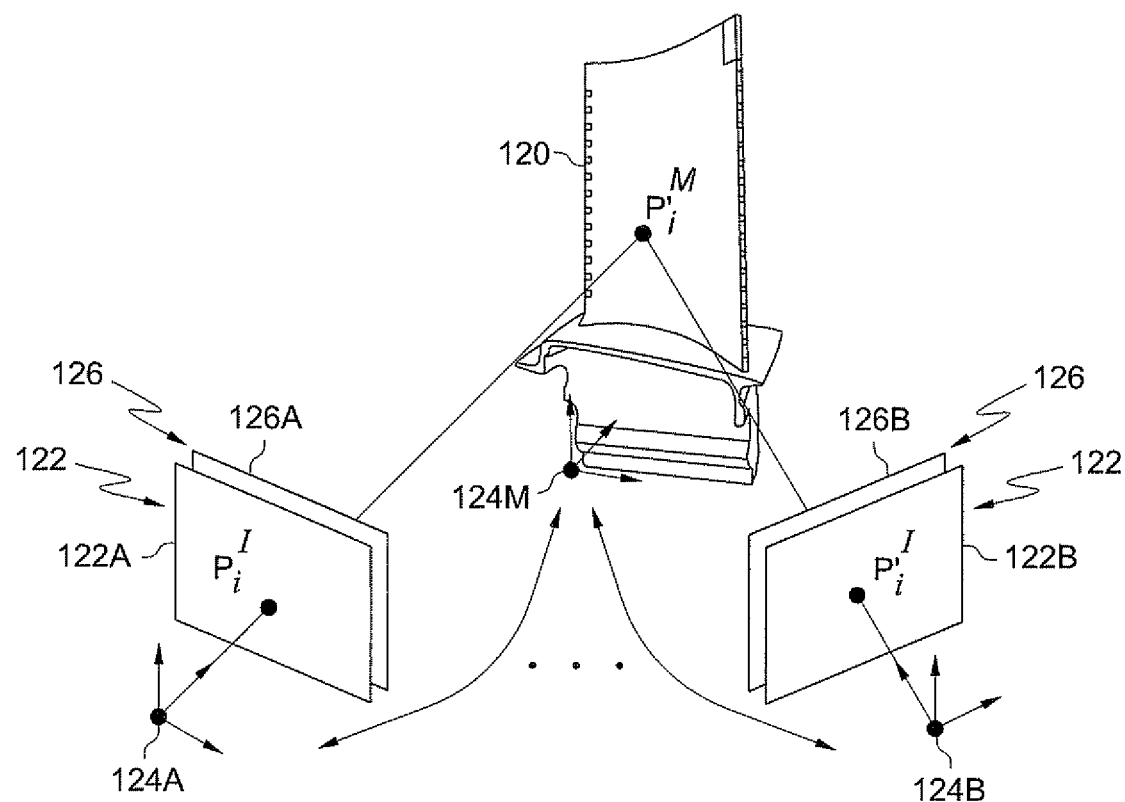
FIG. 2 is a diagrammatic view illustrating interaction between a 3D model and a plurality of 2D image views.

Referring to FIG. 2, interaction with a virtual object may be implemented in either a 2D view, a 3D view or a combination thereof, e.g., by interacting with a 3D model 120 and/or one or more images 122 of the object. In this regard, each image 122 may comprise for example, a 3D view of the virtual object, such as may be presented on a display screen, a 2D view of the virtual object, such as may be derived from a corresponding 2D image file or the view may be derived from or otherwise generated from the 3D model, etc.

For purposes of illustration, assume that a first image 122, further designated 122A, is taken from a first perspective which is schematically illustrated by the first local coordinate space 124A. A second image, further designated 122B, is taken from a second perspective which is schematically illustrated by the second local coordinate space 124B. Similarly, the 3D model 120 is oriented in a third perspective which is illustrated by the third local coordinate space 124M. A point $p_i^I$ on the first image 122A references and is mapped to a corresponding global coordinate point $p_i^M$ on the 3D model 120. This point $p_i^M$ on the 3D model 120 can then be further mapped to a corresponding location on alternative images that also reference the global coordinate point $p_i^M$. For example, as shown, the point $p_i^M$ is further mapped to a corresponding location $p'^I_i$ within the second image 122B.

Thus, a designated global coordinate point of the 3D model can map to a corresponding image point of one or more images, e.g., image file data, image views on a display screen etc. that have a view that encompasses the corresponding global coordinate point. Accordingly, a markup associated with the global coordinate point $p_i^M$ may be automatically conveyed to a view of either the first image 122A or the second image 122B because the image point $p_i^I$ on the first image 122A and the image point $p'_i^I$ on the second image 122B both reference the same global coordinate point $p_i^M$.

As an illustrative example, a range map 126 can be used to map points back and forth between the 3D model 120 and a corresponding image 122. For example, as shown, a first range map 126A provides pixel-by-pixel range data that maps image points in the first image 122A to corresponding locations on the 3D model. The resolution of the range map 126A is the same as the first image 122A. As such, range data is provided in the range map 126A for each pixel in the first image 122A. Moreover, the unique range data corresponding to each pixel of the first image 122A provides surface location and depth dimension information required to establish a one-to-one mapping between its corresponding image pixel and an associated location on the 3D model. Similarly, as shown, a second range map 126B maps image points in the second image 122B to corresponding locations on the 3D model.

According to an aspect of the present invention, a user, e.g., a human operator, an automated or semi-automated process, etc., may implement markup and editing operations within a single view or within multiple views of the modeled object. For example, each control/feature point picked by the user in a first view can be mapped to associated 3D global coordinates, e.g., by looking up the appropriate mapping in the range data of a corresponding range map. Alternatively, if the user is operating with a 3D view, the 3D global coordinates of the picked control/feature point can be extracted from the 3D model such as by using visualization and interaction functions, e.g., using OpenGL or other video standards or by using other techniques.

A user may be interested in a feature that is larger than that which may be seen within a given view. As such, the user may identify a plurality of image points in a given view, e.g., to define a location of interest that characterizes the bounds of a line, area, volume, etc., also referred to herein as a feature. Further, because identified image points map to associated global coordinate points of the associated 3D model, the location of interest may be correspondingly mapped to the surface of the 3D model. As such, a 3D global coordinate point of a modeled object may be visualized in a given 2D view of that modeled object where the 2D view encompasses the 3D point in its field of view. Additionally, a 2D feature from a first 2D image of a modeled object may be visualized in another 2D image of the modeled object if the feature of interest is at least partially in the field of view of each image.

According to an aspect of the present invention, markup tags, i.e., metadata, annotations, etc. that are created with regard to a location of interest on the 3D model may be conveyed to any one or more corresponding 2D view(s) that have at least one image point that correlates to a corresponding designated global coordinate point of the 3D model that characterize the location of interest. In this regard, the markup may be created from either a 2D or 3D view. For example, a markup created once in one 2D view can be automatically conveyed to one or more other 2D views having at least part of the associated feature in its field of view. As such, a user is not required to markup the same feature, which may appear in two or more views, more than once. However, that markup of the feature, regardless of which particular view was used to identify it, is conveyed to each view that also includes at least a visible portion of the feature. As will be described in greater detail below, the user, e.g., in the case of a human operator visually inspecting the images, may elect to hide or display the markup information.

Moreover, according to various aspects of the present invention, a given feature mapped onto the 3D model may be characterized by two or more parts or segments that are visible across multiple 2D views, but not entirely visible in one or more of the individual 2D views. That is, a user may define a feature of interest on the 3D model by identifying portions or segments of the feature of interest in turn from two or more views of the associated image set. Thus, for example, a location of interest, e.g., that characterizes a feature to be inspected that is not entirely visible in a single image can be created in a piecewise fashion by considering multiple views in turn.

Similarly, when operating on a 3D view of the 3D model, a feature of interest may not be entirely visible in a given orientation of the 3D view. The entire feature may be identified by rotating the 3D view into different orientations to enable markup of the feature in a piecewise fashion as different segments of the feature are visible in different orientations. Further, the inspection and markup operation may be implemented by considering a combination of 2D views and 3D views, as selected by the user, to identify one or more features on the modeled object.

Depending upon the specific geometry of the modeled object, it is possible that a global coordinate point on the 3D model may map to an associated 2D view, but that point may be obscured by surface features of the object that hide that point on the 2D image within its field of view. As such, for a given original global coordinate point on 3D model, its mapping in any given 2D view may be realized, and a verification may be performed to determine its occlusion, i.e., visibility in the corresponding view, by checking the range data.

To visualize a 3D point in a given 2D view, the 3D point is projected in the 2D view. This may be accomplished, for example, using known camera internal and external parameters. Further, the visibility of the projected point in the 2D view may be checked, e.g., where a surface feature of the object may obscure visibility of the point in the particular 2D view. If range data is available for the projection, e.g., where range data has been previously determined and provided, e.g., in a range map, the mapped global 3D coordinates of the projected 2D point are retrieved by looking up the associated range data. The mapped 3D point may also be compared back with the original 3D point to check whether the original global coordinate point is visible.

The range data may also be missing or previously otherwise not determined. For example, the projected 2D point, i.e., a point projected from the 3D model to a 2D view, may be located in a shadow of the 2D view. Under this arrangement, range data may not be available for those image points in the shadow, thus a direct 3D-2D mapping of the global coordinate may not be available. However, a correspondence between points in the area of the shadow of the 2D view and the 3D global coordinates may be obtained, for example, by projecting an optical line or projected ray from one or more 2D points and computing intersection points of the projected rays with the 3D model mesh.

In particular, known camera internal and external parameters may be used in combination with the known orientation of the 3D model to identify a 2D coordinate taken from the point of view of the camera, and from which the ray is projected, and an algorithm may be implemented to determine the intersection point between a given projected ray and the 3D model, as is further described below. The projected ray may pass through several surfaces of the 3D model, defining an intersection point for each surface through which the projected ray passes. The original point on the 3D model, i.e., the one corresponding to the surface feature, will be visible and mapped to the 2D view if it is the closest point of intersection relative to the point of view of the camera. Otherwise, the feature point on the 3D model will be considered to be obscured by a surface of the 3D model that lies between the feature point and the point of view of the camera, and therefore will not be visible in the 2D view.

In the above-described process for identifying points located in a shadow within a 2D view, the raw data obtained by the camera may be used for reference to determine coordinates of a 2D view relative to the global coordinates of the 3D model because, in the exemplary process of raw data acquisition, camera internal parameters may remain constants. Therefore, the range data of all the views in an image set may be used for camera internal calibration of the inspection apparatus used to derive the information to create the 3D model of an object of interest. For example, for each view, a pre-defined number of range data may be sampled to obtain the correspondences of 3D points in a camera coordinate system and their image points in the 2D views. Also, all the sampled 3D-2D correspondences (from all the views) for the internal calibration may be processed, such as with a Tsai algorithm for the case with fixed external parameters.

With regard to determining the point of intersection between a projected ray and a surface of the 3D model, an algorithm may be implemented of O(sqrt(N)) complexity, where the model is conventionally a triangle mesh with N defining the number of model points in the triangle mesh. That is, where there are N points on the 3D model (i.e., as defined by a point cloud), and where additional information on the triangulation of the 3D model is available (i.e., a list of triangles with three vertices identified from the point cloud), it is possible to intersect a given ray with the 3D model with complexity proportional to the square root of N. Assuming the connectivity of the model mesh is available, the algorithm may be implemented for an "S" number of samplings, i.e., S projected rays originating from the point of view of the camera, where the algorithm for each sampling comprises randomly picking a point on the 3D model and finding a neighboring point that is closer to the projected ray until the closest point on the 3D model to the projected ray is found. Among the neighbor triangles of the above closest model point, the algorithm finds the intersection point of the 3D line with the model triangle mesh, and tries to find as many different neighbor triangles as available for each of the S intersection points.

There is likely a large probability that all the intersection points of each projected ray with the 3D model mesh should be found in the S samples. Assume that an optical line intersects with the 3D model surface at C points. If all the S samples are picked randomly, the chance of at least one of the intersection points never being found from the above procedure will be $(1-1/C)^S$. In most of the cases, C=2, therefore, the chance is 0.097% when S=10. For a more complicated closed model surface, e.g., where C=4, the chance of not finding all intersection points is 5.6% when S=10. The probability will reduce to 1.3% when S=15.

Figure 3:
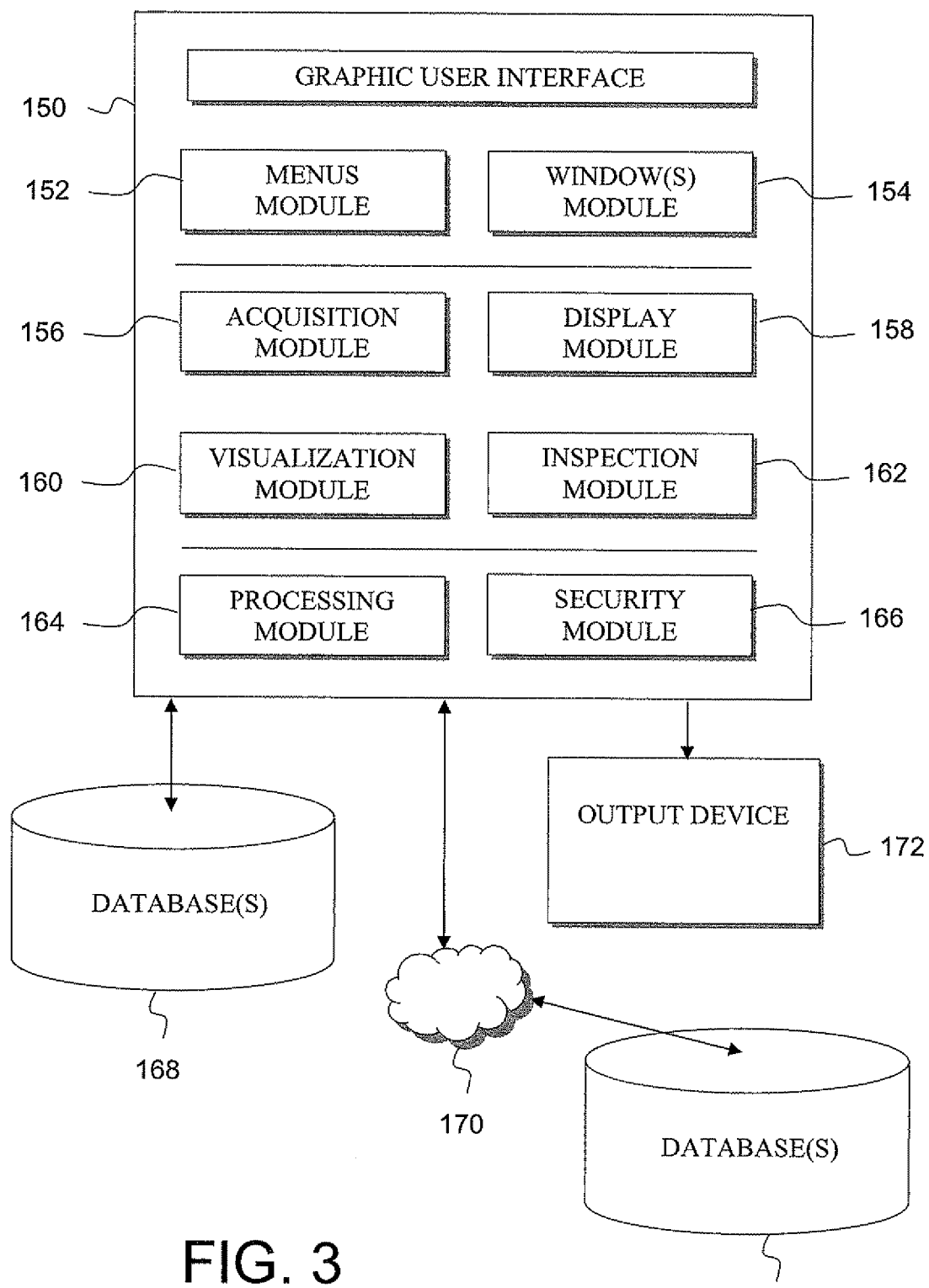
FIG. 3 is a schematic illustration of a graphics user interface (GUI) of an inspection system that allows an operator to interact with image sets to visually inspect modeled objects.

Referring to FIG. 3, various aspects of the present invention may be implemented in a graphics user interface (GUI) 150 of an inspection system that allows an operator to interact with various views of information corresponding to an image set to visually inspect virtual objects. As schematically illustrated, the GUI 150 includes a menus module 152 that functionally implements menu logic that allow the user to navigate the inspection system and perform operations on selected 2D and/or 3D views of a corresponding selected image set. The GUI 150 also includes a windows module 154 that functionally implements logic for graphically displaying various views of the image set as well as various commands and operational parameters as an operator interacts with the GUI 150 in one or more windows. For example, the windows module 154 may generate a main working window as well as a thumbnail window that allows multiple thumbnail representations of the various images of a selected image set to be displayed.

An acquisition module 156 is configured to acquire an image set including a 3D model of an object of interest and may support features related to file management. For example, the acquisition module 156 may support browsing, searching, filtering and other data management aspects that enable an operator to locate a desired image set and load that image set into the inspection system for inspection and/or analysis as will be described in greater detail herein. The acquisition module 156 may also handle routine tasks that are necessary for moving image data between a corresponding storage device or devices and the GUI 150, such as by implementing any necessary compression, expansion, image resolution scaling, synchronization or other functions.

A corresponding display module 158 is provided for graphically displaying views of a selected virtual object. The display module interacts with the acquisition module 156 to display views of images from the image set including 3-D and 2-D views. The display module 158 also interacts with the menus module 152 and windows module 154 to control screen positioning of the corresponding views and commands implemented by the GUI 150. For example, the display module 158 may display an operator selected view of a virtual object, e.g., a 2D or 3D view, in the main working window, and a plurality of thumbnail views of the non-selected images from the corresponding image set.

A visualization module 160 may also be provided for performing image processing, visualization and other functions which may be utilized to better visualize features of interest within the model object for generating markups. For example, the visualization module 160 may allow the operator to apply hue, color, saturation, brightness and other effects to 2D images viewed in the main working window. The visualization module 160 may also provide image rotation and other 3D orientation and effects of 3D views of the virtual object in the main working window. The visualization module 160 will be described in greater detail herein.

An inspection module 162 is also provided. The inspection module 162 may be configured to allow an operator to record information with regard to inspection of a virtual object. For example, an operator interacting with a view of a virtual object in a main working window may graphically identify locations of interest on the view, and markup those identified locations by recording information that characterizes inspection information that the operator assigns to those corresponding locations as described in greater detail herein. As another example, exploiting the above-described mapping from a 2D view to a corresponding 3D model and/or mapping from the 3D model to other 2D views, a markup created by an operator on a first view may be automatically conveyed to each additional view where the identified markup location is visible. Thus, when the operator selects a second view to be graphically displayed in the main working window where the previously marked up location is visible, the markup information is conveyed with that new view. The operator may then elect to view or hide the conveyed markup information. The markup tags and corresponding markups will be described in greater detail herein.

A processing module 164 is configured to handle the background processing associated with the GUI 150, such as when an operator identifies a location of interest on a view of a virtual object. For example, the processing module 164 may map image points on a 2D view that were selected by the operator to corresponding global coordinates on the associated 3D model, e.g., using the range maps 126 described above. Further, the processing module 164 may handle processing required to associate markup tag information created by the operator with the designated global coordinate points of the 3D model. As such, markups created by the user, regardless of whether created from 2D or 3D views of the virtual object, are mapped to corresponding locations of the associated 3D model. The processing module 164 may also handle processing tasks required to implement image processing, statistical analysis or other functions performed by the GUI 150.

The GUI 150 may also include a security module 166. The security module may be used, for example where user permissions, user access levels and other security features are desired in the particular application. The GUI 150 may also interact with one or more storage devices that maintain databases 168 of the image sets and corresponding inspection data. The databases 168 may be stored on a local data processing system or one or more databases 168 may be distributed across a network 170. The GUI 150 may also interact with one or more output devices 172, such as displays, printers, etc.

Although the GUI 150 is described in general terms with reference to the menus module 152, the windows module 154, the acquisition module 156, the display module 158, the visualization module 160, the inspection module 162, the processing module 164 and the security module 166, the above is provided to illustrate the collective functions of the GUI 150. Moreover, other modules may be provided depending upon the specific implementation and/or the functions implemented by two or more modules may be combined or consolidated into fewer modules. The functions of each of the above identified modules may be also be changed, combined, simplified, expanded upon or otherwise varied based upon implementation and design requirements for a specific application.

Figure 4:
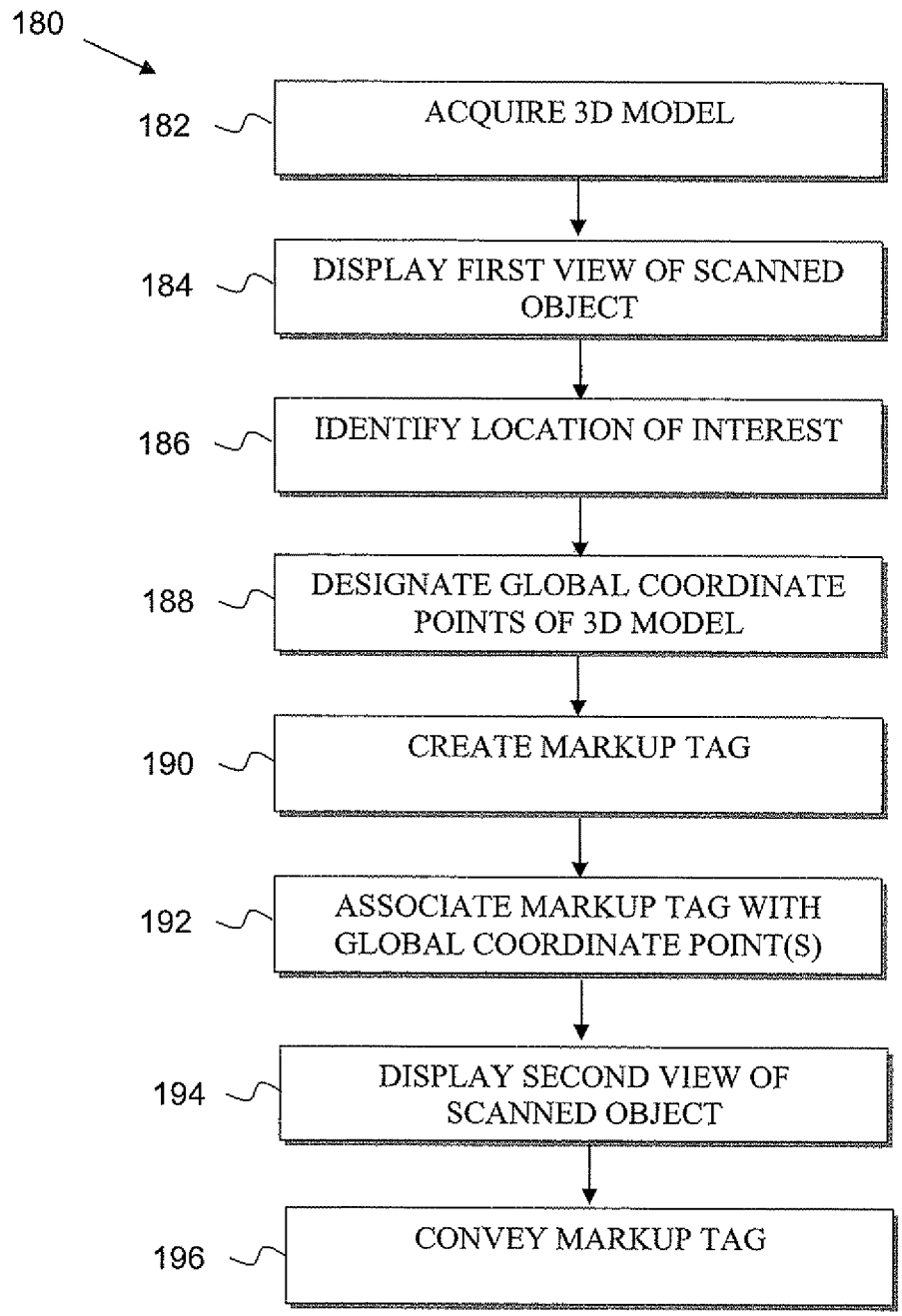
FIG. 4 is a flow diagram illustrating a method of using a GUI for interactive virtual inspection of modeled objects.

Referring to FIG. 4, a method 180 is illustrated for using a graphic user interface of an inspection system for interactive virtual inspection of a modeled object. The method 180 may be utilized for example with the GUI 150 described with reference to FIG. 3. A 3D model of a modeled object is acquired at 182. A first view of the modeled object is displayed at 184 and the operator identifies at 186, a location of interest on a surface of the modeled object that is visible within the first view. Global coordinate points are then designated at 188 of the 3D model that characterizes the location of interest on the modeled object.

The operator creates a markup tag at 190 having information that annotates the location of interest selected by the user in the current view and the markup tag created by the operator is associated with the designated global coordinate points of the 3D model at 192. A second view of the modeled object is displayed at 194 having at least one image point that correlates to a corresponding designated global coordinate, point of a 3D model that characterizes the location of interest. The markup tag is conveyed at 196 to the second view of the modeled object. When the markup information is conveyed, an operator may have the option, for example, to either turn the display of the information on or off to selectively determine whether or not the markup information will be visible or hidden from view.

Figure 5:
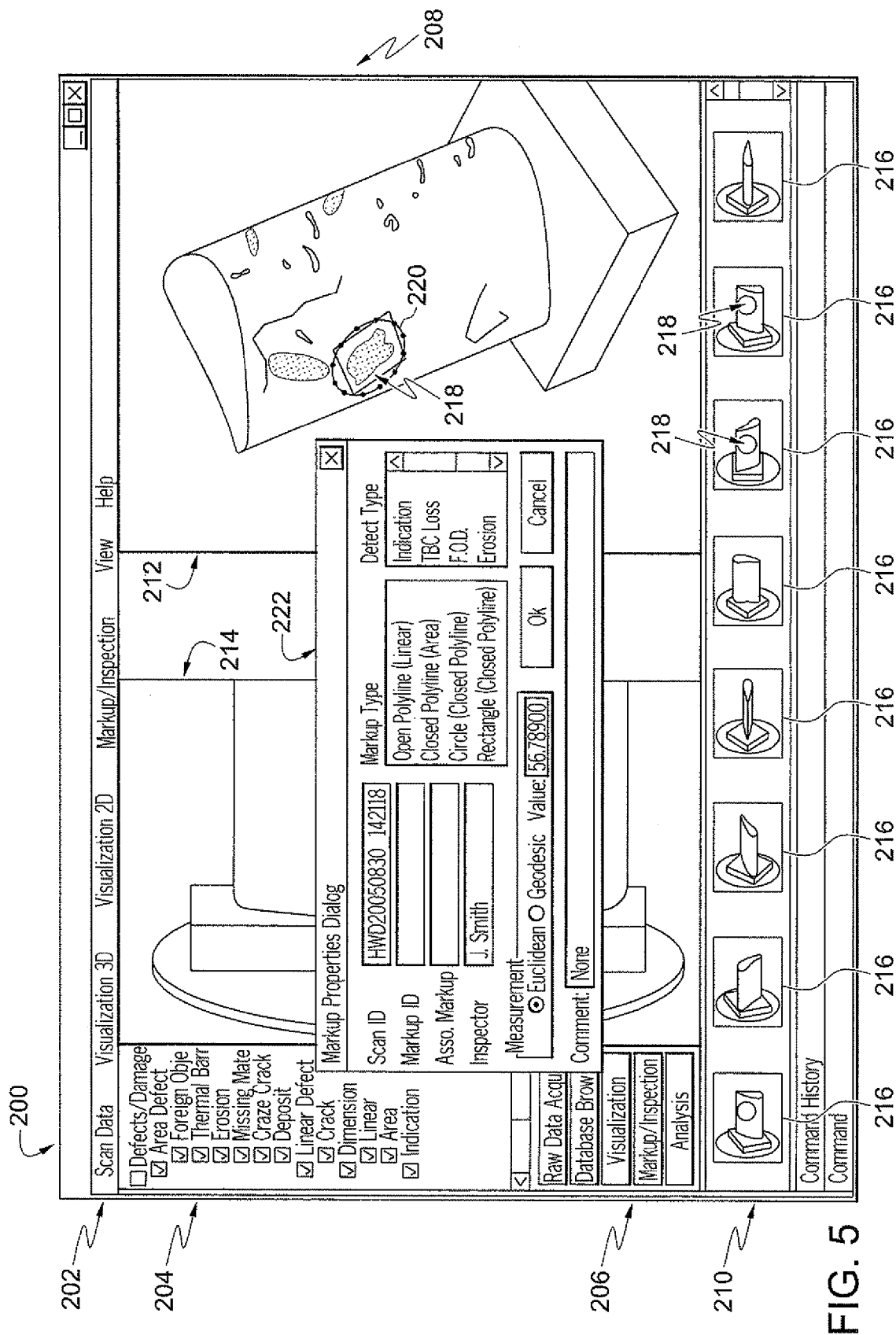
FIG. 5 illustrates an interface comprising a screen display in which an image set of a turbine blade has been acquired and loaded.

Referring to FIG. 5, a sample screen shot illustrates an exemplary interface 200 to an inspection system according to various aspects of the present invention. For example, the interface 200 may be generated by the GUI 150 described with reference to FIG. 3. The interface 200 includes a plurality of windows including a menu window 202, a control window 204, a mode window 206, a main window 208 and a thumbnail window 210.

The method 180 of using a GUI as described with reference to FIG. 4 may be implemented for example, by interacting with the interface 200 of FIG. 5 and correspondingly, the GUI 150 of FIG. 3. For example, with reference to FIGS. 3, 4 and 5 generally, a 3D model of a modeled (virtual) object is acquired. For example, an operator interacting with the interface 200 may select appropriate controls from the mode window 206, such as a "Raw Data Acquisition" control to load an image set or "Database Browse" control to perform database browsing and/or scan data filtering, e.g., to search, filter, locate and select an image set to load into the inspection system. Using the Database Browse control, an operator may use a command line or graphics window (not shown) to enter structured query language (SQL) queries of one or more databases 168 of image sets. In response thereto, the acquisition module 156 of the GUI 150 may correspondingly interact with one or more of the databases 168 to implement the user-directed search, filter and/or query functions, etc. and to retrieve and load a desired image set of an object for visual inspection.

The operator may be able to show, hide or select image sets from the search results. The operator may also be able to search directly from the database and display the thumbnails of the corresponding views, e.g., based on the properties of the views using the database search dialog. As yet another illustrative example, from a database browsing view, the operator may be able to directly filter image sets based on the names or other properties of the corresponding objects, including wildcards, etc. To perform a simple search, an operator may check corresponding boxes and/or select designated options, such as file names, date range, etc.

In order to handle large amount of raw data that may be associated with a virtual object, e.g., 2D image files, a 3D model and corresponding range maps, the raw data stored in the database(s) 168 may be tagged, either directly or via a separate data file with searchable information such as an object ID, region(s) of interest, a serial number, time, date, and/or other information. The object ID and/or other information may be input by an operator, e.g., at the time of rendering the virtual object. The object ID and other information may also be entered by image recognition software capable of reading an object identification marking, such as a cast, machined or marked alphanumeric or barcode on the actual object.

As yet another example, a "view based" search may be performed that allows a query/filter to select image sets based upon view name, rotation, tilt, scan platform rotation angle, tilt range, or other tagged image metadata. The result of the search can be displayed, for example, in the thumbnail window 210 of the Interface 200. From the thumbnail view, the operator can select the desired image set to load for inspection.

Moreover, according to various aspects of the present invention, the operator may be able to perform operations (not shown) from the control window 206 such as displaying the main properties of the image set or viewing thumbnails of selected (highlighted/filtered) image sets. The operator may also be able to switch to other modes such as a visualization mode using the "Visualization" control and/or an inspection mode using the "Markup/Inspection" control, which will be described in greater detail below.

2D inspection images may be provided from a sufficient number of angles relative to the actual object to provide full coverage of the 3D object surface(s) being inspected, which may be the entire surface of the object or only selected surface(s) of interest. For a gas turbine blade, for example, it is expected that 16 to 18 images may be necessary to obtain adequate photographic images of all of the surfaces of the blade. It may be possible to align the edges of adjacent photographs precisely so that the 2D photography data is seamlessly available for the entire 3D surface area. This may not be a practical approach for certain applications, so some overlap of adjacent 2D inspection data may be digitally stitched to provide a continuous 2D image in the region of overlap. The acquired 2D images may also be combined into a seamless map of image data points (pixels) sufficient to cover the 3D object surfaces.

Various averaging or smoothing processes may be used to accomplish such stitching, with appropriate hue, saturation and/or luminance adjustments being made to the adjoined data as appropriate. The combined maps may be associated with geometrically corrected surface points rendered as a solid model from 3D dimensional measurements, so that the resulting data file is harmonized to 3D dimensions and 2D surface mapping, and the graphical presentation provides a virtual 3D solid model of the actual appearance of the tested object at the time of the test. For objects having non-critical regions or regions where no inspection is required, it may be possible to orient the edges of the 2D photography data within such non-critical or non-inspected regions, thereby simplifying or rendering moot the issue of 2D data stitching.

Regardless of the number of 2D image files, when an image set is loaded, each image file is provided as a thumbnail view in the thumbnail window 210. For example, from the thumbnail view as shown in the thumbnail window 210, the operator can instantly visualize the selected view and compare images side by side, e.g., by loading select views into the main window 208 to select images to load into the main window 208.

In an inspection/markup mode, e.g., entered via the "Markup/Inspection" control, the operator may interact with one or more 2D and/or 3D views of the selected virtual object. The Markup/Inspection features may be implemented, for example, by the inspection module 162 and optionally, other modules such as the processing module 164. For purposes of illustration, in the interface 200 of FIG. 5, the operator has acquired and loaded an image set of a turbine blade and has brought a first view showing a 3D projection view 212 of the blade as seen to the right hand side of the main window 208.

The main window 208 may also be split into regions, where each region displays an operator selected view, e.g., a different 2D or 3D view selected from one or more of the image files and/or 3D model. For example, as shown, a 2D view 214 is also displayed in the main window 208, as seen to the left hand side of the main window 208. The views 212, 214 were selected from a plurality of thumbnail views 216 of the virtual object illustrated in the thumbnail window 210.

The operator identifies a location of interest on a surface of the model object that is visible within the first view. It is likely that the image set will include high resolution 2D image files. As such, the operator selected view in the main window 208 may comprise a representative view of the selected image file, e.g., by zooming in or out of the image file, by rotating, transforming and/or by providing image compression, resolution adjustments or other processing techniques to assist the operator in inspecting the virtual object. Moreover, regardless of whether the selected view in the main window 208 is a 2D or 3D view, the operator may use graphics tools to mark out a boundary that identifies a location of interest.

As shown in the main window 208, the user has designated a location 218 on the view that shows a feature of interest by inserting onto the view, a plurality of control points 220 that outline the feature of interest. The location 218 may be designated by a markup geometry defined, for example, by a line, area or volume so as to encompass a feature of interest. Predefined markup region shapes and/or sizes may be selectable, e.g., via a menu and/or the operator may have the flexibility to draw the markup location 218 by freehand drawing the control points 220 directly onto the 2D or 3D image, such as via a mouse command. In this regard, tools may be provided to allow the operator to move, insert or remove control points, such as by clicking and dragging control points with a mouse or other input device.

Global coordinate points of the 3D model are then designated that characterize the location of interest e.g., a 3D subset of the larger modeled object. As will be described in greater detail below, a markup tag containing information can then be created that is associated with the location of interest. For example, if the selected view is a 2D view representing an image file, the inspection system, e.g., via the processing module 164, maps the 2D image points, including the control points 220 identifying the location 218, to corresponding 3D global coordinates, such as using an associated range map 126 as described in greater detail herein.

Visual inspections may depend upon the ability of the inspector to evaluate visual clues related to characteristics such as the amplitude and color of light reflected from the surface of a object in order to enable the inspector to make an overall condition assessment, such as to determine the severity and extent of degradation, and to detect and to characterize visible defects. Assessment of such visual clues, together with the use of observed and measured surface dimensional information as well as other information, may be collected and stored in markup information as an evaluation of a corresponding object. As such, markups may be used, for example, to record damage detection, classification, evaluation, markup geometry and/or other information of interest. Additionally, markups may be used to record information that is not directly related to characterizing the location of interest. For example, a markup may contain information such as the date and time of the inspection, the operator identification and other information of interest. Moreover, the assignment of markups may be automated or semi-automated, e.g., to implement advanced markup data gathering, supervised machine learning, and high dimensional data processing and visualization.

As illustrated in FIG. 5, the operator has identified the location 218 by setting a plurality of control points 220. The operator may then annotate the location 218 with a markup that describes the location. For example, the operator may select the "Markup/Inspection" control from the mode window 206, which may open a markup properties dialog box 222. The markup properties dialog box allows the operator a convenient platform to record observations in a consistent and defined manner, e.g., by providing drop down boxes, radio buttons, form fields, predetermined menu choices etc., to define the feature (where applicable).

Before finalizing the markup creation, the operator can set the properties of the markups, such as by providing general information such as a scan identification, markup identification, inspector, measurement types such as geodesic or Euclidean, and save the geometric and other properties of the markups to the database. The inspector may also characterize the location of interest by annotating the feature/defect type. For example, for inspection of turbine blades, preconfigured inspection fields may be specified to define a classification for the defect, such as general area defects including foreign object damage (FOD), missing material, holes, loss or spallation of coatings, burns, oxidation, erosion, corrosion, foreign material buildup, dents, gouges, scratches and pitting, localized and linear indications, such as low cycle fatigue cracks, thermal-mechanical fatigue cracks, high cycle fatigue cracks, creep rupture cracks, coating craze cracks, thermal barrier coating cracks, corrosion cracks, tightly closed high-cycle fatigue cracks, etc. As such, locations of interest on a virtual object may be classified, identified and documented in corresponding markups. Other types of markup information may also/alternatively be utilized, depending upon the nature of the object being inspected.

The operator can visualize and inspect both the 2D and 3D views of the virtual object and markup the inspection in a manner that fits the workflow of the inspector. That is, the user may switch between selected 2D and 3D views to best enable the inspection and markup operation, such as by selecting an appropriate menu option in the menu 202, see FIG. 5. Regardless of the particular view, the collected information is coalesced into the 3D model so that it can be conveyed automatically to all views that include the location of the virtual object characterized by the markup. For example, some inspectors may be more comfortable working with 3D view of a virtual part while other inspectors may prefer a 2D view. As such, during the inspection workflow, the operator may assign markups that characterize locations on the surface of the model, e.g., by annotating selected views of the image set to indicate the inspection results. Such operations may track all of the parameters of each pixel of image data of the marked up view from the range data to the 3D model surface.

These markups are then directly converted and coalesced into the 3D model and can thus be visualized on corresponding 2D and 3D views of the virtual object. Moreover, the markups may be displayed in 3D views of the virtual object regardless of whether textural features of the 3D model are also displayed. As noted more fully herein, as the operator changes views, markups are projected to those views where the corresponding location of interest is captured within the field of view of the corresponding image. As such, the location 218 and corresponding markup 222 created by the operator with respect to a representation of the virtual object in a first view, e.g., the active view in the main window 208, is automatically conveyed to each view having at least a portion of the identified image visible. That is, a markup region defined in any view is automatically configured into the 3D virtual object model and is conveyed (and thus displayable) in any other 2D or 3D view. For example, as seen in the thumbnail window 210, the identified location 218 in the view in the main window 208 is automatically conveyed to each thumbnail view in the thumbnail window 210 that includes a view of at least a portion of the identified location 218. Moreover, the associated markup 222 is automatically conveyed to those views. If the operator selects a thumbnail having the location 218 for viewing, the operator can inspect the associated markup 222 without having to re-enter the markup inspection results.

Moreover, the location of interest 218 on the 3D model may not be completely viewable from a single 2D image. For example, contours, corners and other geometries may obscure the entire feature of interest from the 2D view in the main window 208. As such, the location 218 on the 3D model may be edited, revised and/or otherwise modified by interaction with multiple views, e.g., from different image files. However, any change to the location(s) of interest or their corresponding markup information is automatically reflected back to each view of that location of interest because the markup information available to each view is mapped from the 3D model using the range map 126 as described above.

The interface 200 also provides markup visualization control as seen in the control window 204 towards the left of the interface 200. With this exemplary markup visualization tree, markup types, defect types and other properties of the markup information can be conceptually organized into layers that the operator can control to selectively visualize or hide. The control window 204 may also provide tools that allow the operator to customize the display colors, completion levels and/or other visual aspects of the interface 200. As such, the layer control provided by the control window 204 allows the operator a convenient manner of specifying whether conveyed markup information is visually displayed, e.g., when changing views in the main window 208, etc.

Various forms of surface features may appear differently under various forms of nondestructive imaging. An operator may be able to utilize such differences to diagnose a condition of an object. For example, a surface feature that appears in a thermography image but not in a visible light photograph may be interpreted as a subsurface feature. An inspector may further exploit the capabilities of such a visualization and inspection system by performing a first inspection of a surface area using a first type of 2D inspection data, such as relatively lower resolution color photographic data. The operator may also utilize a second inspection of only selected regions of the surface area that are found to display features of interest during the first inspection.

The second inspection may be performed using a second view of the virtual object displayed with a surface as produced using a second type of 2D inspection data, such as relatively higher resolution black and white or color photographic data, as an example. Any combination of displays of the virtual object may be used in any order as may be found to function effectively to diagnose conditions of interest. Regions found to contain features of interest in any view may be marked as described above, with such information being saved digitally in a manner that facilitates the sorting, grouping and analyzing of such data for one or more such objects in any one of the associated views of the object.

Moreover, during interaction with the selected views in the main window 208, the operator may desire to apply image processing techniques to the displayed view, e.g., to better identify features of interest. Accordingly, the interface 200 may include Visualization tools. As an example, an operator may select a "Visualization" control from the mode window 206 which causes the visualization module 160 of the GUI 150 and optionally other modules such as the processing module 164 to implement an operator selected image processing task.

For example, the operator may change the displayed view of a 2D image in the main window 208, such as by adjusting the contrast, brightness, gamma, saturation, hue, rotation, zoom etc., of the selected view. The visualization module 160 may also be capable of applying a histogram operation (equalization) to the view. The 3D model may be produced, for example, by stitching piece-by-piece scan data together. The model can be visualized with or without color texture mapping.

For 3D model visualization, the inspection system may implement functions to handle the viewing of a 3D view of the 3D model, such as rotation, panning and zoom of the 3D model in the virtual space. Visualization tools for manipulating the associated 3D model of the image set may include image processing tools such as visualization of a 3D Model Point Cloud, visualization of a 3D Model Mesh, visualization of a 3D model with Texture, Show/Hide controls for a 3D View Control Window, Show/Hide controls of a 3D Coordinate Axes, Color/Gray 3D View, Mouse Zoom, Mouse Pan, Mouse Free Rotation, Mouse X-axis Rotation, Mouse Y-axis Rotation, Mouse Z-axis Rotation, etc. For example, a 3D model visualization shown in the main window 208 may include a 3D view control floating window that includes a camera position that can be edited to rotate, shift, zoom or otherwise reposition the view in the main window 208.

Both relatively high resolution inspection data and relatively low resolution inspection data may be manipulated by the inspection system. For example, lower resolution data may be acquired and analyzed in regions of a object that are of relatively lower concern, such as regions of low stress or regions that historically are not subject to degradation or that are subject to types of degradation that are only of concern when they reach larger sizes, such as general area erosion for example. Selected regions of an object may be subjected to a higher resolution inspection, such as critical or highly stressed areas. In the exemplary inspection of a gas turbine blade, for example, the surface areas of the airfoil may be inspected at a first level of optical resolution, whereas the fillet weld area between the airfoil and the platform of the blade may be inspected at a second higher level of optical resolution.

In addition to, or in lieu of, the mapping of 2D inspection data onto the surface of the virtual object, 3D nondestructive inspection data may be merged with the 3D solid model of the object. The 3D inspection data may include data from radiography, computed tomography, ultrasonic inspection or other forms of volumetric nondestructive examination. Such information may prove useful to an inspector for analyzing surface feature indications, since subsurface structures may influence surface examination results. For example, a linear indication visible on the surface of the virtual object when thermography inspection data is mapped onto the 3D solid model of the object may be understood to be the result of a subsurface reinforcing structure when the virtual object is also viewed in a sectional view using the results of an X-ray examination of the object. In this example, the 3D solid model is merged with both 2D surface inspection information and with 3D internal inspection information.

It may also be possible to label (manually or automatically) the surface of a virtual object under inspection with different zones. For example, a gas turbine engine blade includes the blade airfoil fillet and the blade platform. The blade fillet can be labeled as pressure side and suction side, each side surface may be divided further into zones, such as a plurality of independently identifiable damage zones or other areas of interest. In this regard, 3D model and range data of 2D views, e.g., from the above-described range maps, can be used for the 3D model based segmentation and feature extraction.

In this process, some 3D features may be directly extracted, such as the cooling air holes of the above exemplary turbine engine blade. The results from 3D model based segmentation and feature extraction may then be used for further visualization enhancement. For example, segmented equalization with background pixels excluded can produce better image enhancement for visual inspection.

The 3D model based segmentation may also be utilized for range data compression. As an example, typical uncompressed range data of an 8 MegaPixel 2D view may comprise approximately 96 megabytes. This can be seen because for each image pixel in the 8 megapixel image, the associated range data that characterizes the 3D model surface location and depth dimension mapping is stored as 3 coordinates where each coordinate is a floating point value requiring 4 bytes of information. For a set of scan data that has 12 views, the range data alone needs more than 1 GB of storage. As such, the range data may be transferred to a local database 306 (see FIG. 6) or otherwise be stored locally for efficient operation prior to beginning inspection work on a corresponding image set. Moreover, compression may be utilized to assist in reducing the size of the range data for reasonable storage size and online downloading/uploading in an acceptable time. By removing the background data and applying lossless compression, the range data of each single view can be reduced, for example, to 8-16 MB. For example, foreground segmentation and the availability of range data may be combined for image compression, e.g., by removing background pixels and information where the range data is not available.

Visual inspection features on the model surface are likely to have different geometric and visual characteristics. As such, useful visual enhancement results of different features may require different algorithms or combinations of operations, e.g., 3D based segmentation combined with equalization, etc. As an example, a histogram equalization applied over a selected region could be viewed as the 3D model based segmentation result. For example, color/intensity may be more evenly distributed in the segmented part, thus better results can be expected when applying histogram based operations for image processing and visualization enhancement.

Still further, automatic feature boundary extraction may be implemented, e.g., by applying the combination of image filtering, edge detection, and feature segmentation with active contour operation. As such, automatic refinement of inspection result (markup) may be realized, such as by initializing a markup location as a circle close to the boundary of the real feature. For example, the operator may draw a circle close to the region of interest and the system may automatically segment that selected region by applying appropriate combinations of filters, image processing techniques, etc., to identify the boundary of the identified feature.

As another example, linear feature extraction may be implemented, such as by using a region growing algorithm. By applying skeleton extraction to the area segmented with region growing algorithm, the core of the linear feature, e.g., a crack on a blade platform, can be extracted. An additional benefit of this operation is that it also provides the "thickness" of a linear feature.

As noted above, the markup tag created by the operator is associated with the designated global coordinate points of the 3D model. As such, a markup tag associated with corresponding designated global coordinate points of the three-dimensional model is automatically conveyed to a second view (or any view) of the virtual object that is displayed, which has at least one image point that correlates to an associated one of the designated global coordinate points of the 3D model.

When the markup information is conveyed, an operator may have the option, for example, to either turn the display of the information on or off to selectively determine whether or not the markup information will be visible or hidden from view. For example, whether the operator elects to view that conveyed markup information may be determined by the state of a corresponding layer control established in the control window 204.

Analysis of the inspection data may include the evaluation of the data in combination with related object data. The terms "object data" and "object information" are used herein to include design, operating history, maintenance and repair data and information. The related object data may additionally include information about finite element analysis (FEA) temperature or stress predictions to enable assessment of how well an FEA analysis predicts the conditions of the object. Such related object data may be stored in the database 168 for data analysis. In an exemplary application used for inspecting gas turbine blades, information such as the design basis operating temperature at the surface of the blade may be selectively displayed as a further digital layer on the 3D model surface, e.g., by selectively hiding or viewing the temperature layer in the control window 204 and by displaying the temperature as a data value that may be displayed in associated views in the main window 208, thereby facilitating an evaluation of 2D inspection data with consideration of the operating temperature experienced at the point of a feature of interest on the surface of the blade. Moreover, tools for identifying, labeling, measuring and storing degradations, defects and/or other conditions of interest as individual items may be provided, e.g., for recalling these items for display at a later time or for use in comparative statistical analyses.

The various aspects of the visualization and inspection system allow the inspector to perform an inspection of the real object by accessing and manipulating the virtual object, since all information necessary to perform such an inspection is available via the visualization and inspection system 10. Furthermore, accurate records of the inspection can be archived and compared to previous and future inspection results, such as when comparing an as-manufactured condition, an as-repaired condition, and various as-found conditions associated with varying service exposures. Various aspects of the present invention provide to visual inspections an empirical time-and-condition dimension.

The virtual object may be archived for later comparison with similar information for the same object at a point in time later in the objects life after the original object condition has been changed, or for comparison with similar information for other similar objects. The results of the inspections (i.e. object condition assessments) that are created by the human inspector, using the inspector's training and experience, combined with graphical user interface (GUI) image processing operations or automated image processing operations, may also be recorded as additional surface mapping features on the virtual 3D image of the real object. The results of the inspections may be created by automated image processing, expert system, and related artificial intelligence algorithms to be recorded as additional surface mapping features on the virtual 3D image of the real object. In addition, inspection results may be archived and recalled for various comparisons, to track condition assessment changes through the partial or entire lifecycle of an object or a population of objects, or for the comparison of various objects or groups of objects with design, operational, service and/or repair history data.

With large number of available datasets from database (both remote and local), the inspection system may also be able to fetch data from remote database(s) and batch process data offline, produce and visualize advanced statistical results of markups on the surface of standardized 3D models, and/or electronically generate documents, which can be exported based on the inspection and the advanced statistical results.

As described above, by common digital data organization methods, various markup regions may be separately organized into layers for presentation and statistical analysis of a single object or a group of objects, such as illustrated in the control window 204. For example, according to various aspects of the invention, a density map may be displayed, for example, of all similar defects found in a fleet of similar objects in a single display of a representative object, thus allowing an observer to easily identify regions of such objects that are susceptible to such defects. Alternatively, defects of only a certain type may be displayed selectively.

Statistics may also be generated automatically, such as percentage of the surface area containing a certain type of defect. Defects may be categorized as to severity, such as length of cracks, depth of erosion, size of pits, etc. and appropriate statistics generated for analysis. The progress of defects over time may be presented when multiple inspections are performed on a single object. Regions of the object may be identified prior to the inspection, such as to define inspection zones for an inspector. Such inspection zones may guide the inspector to varying inspection procedures/criteria for each zone, such as by allowing the inspector to "right click" a mouse indicator positioned over such zone to display a viewing window including such inspection procedures/criteria.

The information collected from virtual objects may be collected and stored through time. This facilitates direct and empirical comparisons of time-displaced and location-displaced inspections. Furthermore, multiple inspectors may perform multiple inspections on the same object under the same conditions, even if the inspectors are located in different locations at different times, i.e., the inspectors comprise distributed users. If inspection criteria change over time, an object may be re-inspected by simply performing a new inspection with the new criteria on the stored virtual object. Based upon inspection printouts, common image files (e.g. TIFF, GIF, bitmaps) for use in reports or other digital computer applications and other information, e.g. IGES or STL files may also be output for engineering design interface.

As another illustrative example, the interface 200 may also be designed to visualize advanced statistical results of the virtual inspection and markup. For example, the model obtained from an actual object may be compared with a CAD design by registering the 3D scan model with a "Golden" model, e.g., as extracted from the CAD design. By mapping the surface points back to the surface of a "Golden" model, the spatial statistical results may be displayed on the surface of a virtual model using a common reference orientation to compare multiple image sets. As such, one or more virtual models of a common part type can be normalized to the "Golden" model for comparison and analysis.

Figure 6:
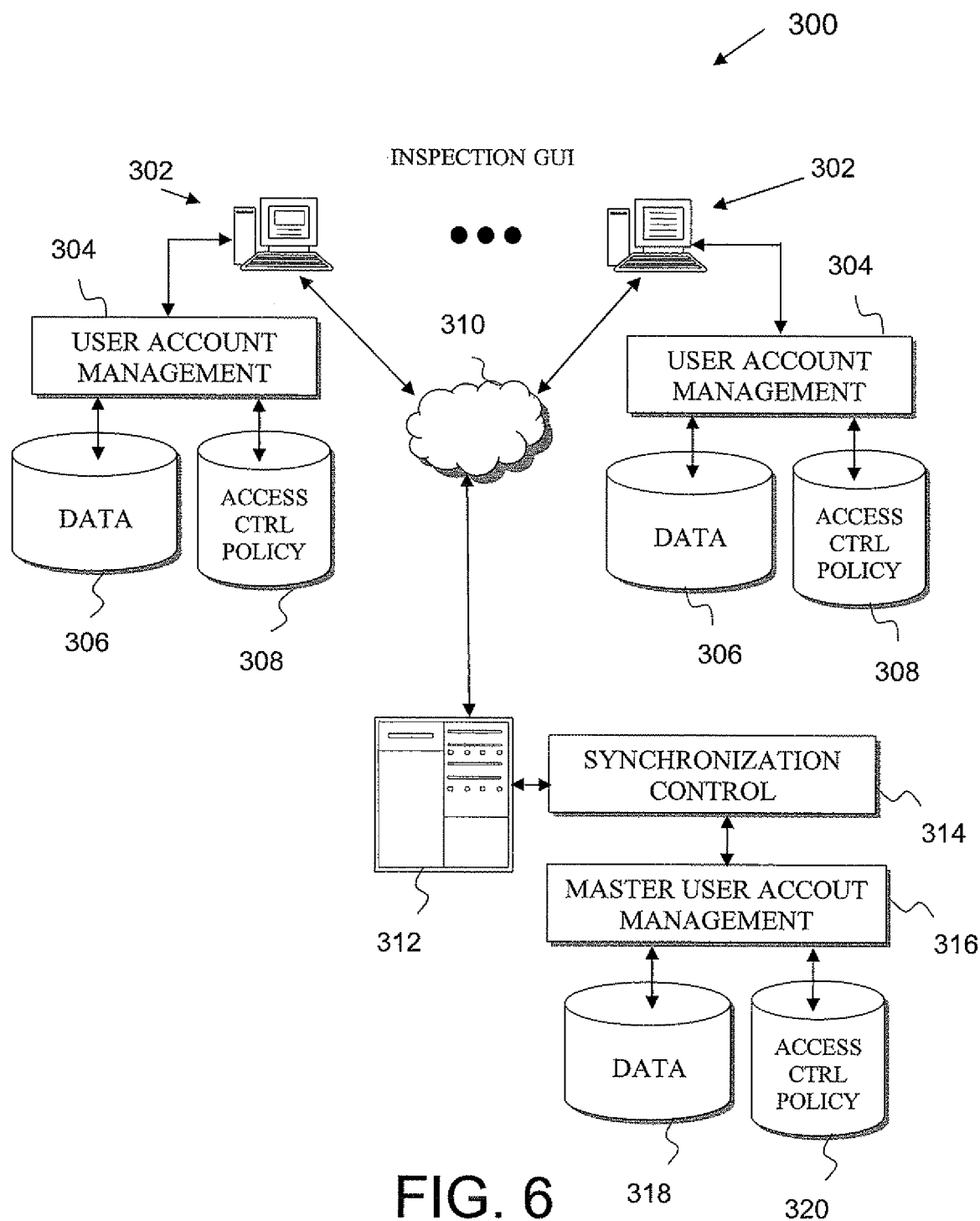
FIG. 6 illustrates a networked computing enterprise implementing the present inspection system.

Referring to FIG. 6, the inspection system may be deployed across a single processing system or networked computing enterprise. For example, as shown, an enterprise 300 includes a plurality of local client processing systems 302 that may be used to execute an instance of an inspection system according to various aspects of the present invention. Each processing system 302 may include local user account management 304, a local database 306, e.g., which stores a local copy of a subset of image data, e.g., a selected image set to be inspected, and optional access control policy information 308. The local user account management 304 of the inspection system may also be synchronized with a centralized database user account management and access control. For example, as shown, the client processing systems 302 communicate over a network 310 to a server 312.

The server 312 includes a synchronization control 314, master user account management 316, master remote database 318 and master access control policy 320. The synchronization control 314 ensures that image set data that is manipulated by a local processing system 302 and is stored to a local database 306 is mirrored back to the master remote database 318.

The optional user account management 304 in combination with the master user account management 316 may be utilized to assign different data access levels to different group of users. For example, a general user may be able to view and use the data but may not be able to make inspection and markups, whereas a designated inspector can inspect the data and add/modify the markups. Other exemplary groups of users, such as a super user or the data owner, may have the authority to delete un-wanted datasets from the system. The access levels may be maintained by the master access control policy 320 and/or distributed as local access control policies, where desired.

Thus, an operator may be required to log onto the inspection system, such as by using a logon ID and password. At the time of login, the local processing system 302 may consult either local user account management 308 or master user account management 316 to verify that the operator is authorized to use the inspection system. Also, the access priority of the logged in operator may be assessed at the time of login by consulting either a local access control policy 308 or the master access control policy 320.

Further, due to the potential for large amounts of data, the image sets may be stored on a centralized (remote) database in the master remote database 318. Thus, only select image sets or image set files need to be distributed to local processing systems 302. For example, a file may be downloaded from the master remote database 318 to the corresponding local database 306, then the raw data files are loaded from the master remote database 318 to the local database 306 the same way as that of accessing the local database. The remote file downloading process may be separated from the downloading of the main application process. Moreover, the inspection system executing on a local client processing device may try the local cache for the required raw data file first before checking the master remote database 318 for the information, then only download the necessary data file for the current operation based on necessary requirements.

Figure 7:
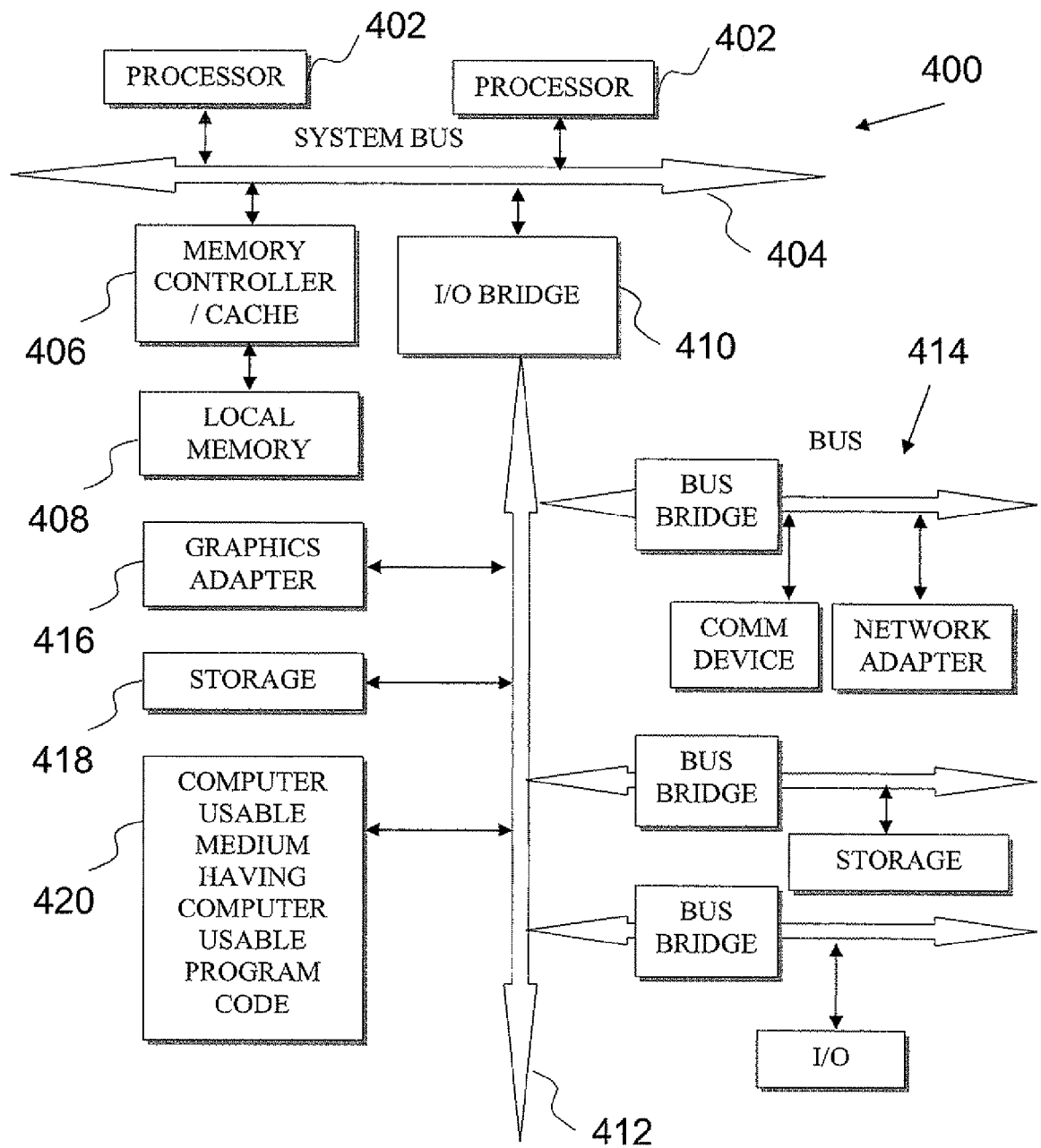
FIG. 7 illustrates a block diagram of a data processing system including a computer usable medium having computer usable program code embodied therewith, where the exemplary computer system is capable of executing a computer program product to implement various aspects of the present invention.

Referring to FIG. 7, a block diagram of a data processing system is depicted in accordance with the present invention. Data processing system 400 may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bus bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Also connected to the I/O bus may be devices such as a graphics adapter 416, storage 418 and a computer usable medium 420 having computer usable program code embodied thereon. The computer usable program code may be utilized, for example, to implement the methods of FIGS. 1 and 4, the GUI 150 of FIG. 3, the interface 200 of FIG. 5 and/or any other various aspects of the present invention.

The various aspects of the present invention may be embodied as systems, computer-implemented methods. Furthermore, various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system. The computer program product aspects of the present invention may have computer usable or computer readable program code portions thereof, which are stored together or distributed, either spatially or temporally across one or more devices.

The hardware in FIG. 7 may vary, depending on the implementation. For example, the above described components may be integrated or implemented as separate components. The depicted example is not meant to imply architectural limitations with respect to the present invention. Moreover, the above configuration is shown by way of illustration and not by way of limitation. As such, other processing system configurations may be implemented. For example, a data processing system suitable for storing and/or executing program code may include at least one processor coupled directly or indirectly to memory elements, e.g., through a system bus or other suitable connection. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of using a Graphic User Interface (GUI) for interactive virtual inspection of modeled objects comprising:
   acquiring a three-dimensional model of a modeled object including storing a plurality of views of said modeled object in a searchable database;
   displaying a first view of said modeled object;
   identifying by a user, a location of interest at a location on a surface of said modeled object that is visible within said first view;
   creating a markup tag having inspection information entered by said user that annotates said location of interest;
   automatically associating said markup tag with said location of interest at said location on said modeled object;
   displaying a second view of said modeled object having at least one image point that correlates to the user identified location of interest on said modeled object, wherein said at least one image point is visible within said second view;
   conveying said markup tag including said inspection information to said second view of said modeled object;
   editing said markup tag at said second view such that inspection information is added to and/or deleted from said markup tag and automatically associated with said location of interest at said location on said modeled object; and
   wherein said step of conveying said markup tag to said second view further comprises a search and filter step comprising:
      conveying search criteria as a query to said database;
      displaying in a thumbnail window of a display thumbnail views from said database corresponding to said search criteria and including information from one or more markup tags; and
      designating one or more of said thumbnail views for display in a main window of said display as a full size high resolution view including information from said markup tag.

2. The method of claim 1, wherein said location of interest visible in said first view defines a segment of a feature on said surface of said modeled object, and further including the step of identifying by said user, in said second view, a location of interest visible in said second view and defining a further segment of said feature, at least a portion of which is not visible in said first view.

3. The method of claim 2, including the step of associating said markup tag with said location of interest defining said further segment of said feature identified in said second view.

4. The method of claim 1, further including viewing a plurality of second views comprising two-dimensional and three-dimensional views of said modeled object, and including the step of switching between said two-dimensional and three-dimensional views to provide additional markups.

5. The method of claim 1, wherein said step of displaying said second view comprises a user selecting a thumbnail view of said second view from a plurality of thumbnail views of said modeled object, and said second view comprises a scanned image of said modeled object.

6. The method of claim 1, including the step of a user selecting a mode from a set of modes comprising a database browse mode wherein a plurality of views of said modeled object are stored in a database and said database browse mode comprises user input of a search query provided to said database, and providing searching based on object properties including an object identifier associated with each of the plurality of views and providing view based searching including searching a view name and/or view orientation.

7. The method of claim 1, including the step of a user selecting a mode from a set of modes including a visualization mode comprising selecting markup tag properties to be displayed with said second view including a markup type and a defect type.

8. The method of claim 1, including the step of a user selecting a mode from a set of modes including a visualization mode comprising optimizing resolution of user selected areas of said modeled object with reference to geometric characteristics or visually observable surface characteristics of said modeled object and said location of interest.

9. The method of claim 8, wherein said visualization mode comprises operating on a segment of said object and applying a histogram operation limited to said segment.

10. The method of claim 1, including the step of a user selecting a mode from a set of modes including a markup/inspection mode comprising identifying said location of interest by a user entering a markup geometry comprising a line, area or volume indicator on said location of interest in said first view, and said markup tag comprises user entered classification information descriptive of said location of interest.

11. The method of claim 1, wherein a plurality of views of said modeled object are stored in a centralized database accessed by a plurality of distributed users, and including the step of synchronizing views accessed by said plurality of users to distribute information from a markup tag produced by any one of said users to any other user.

12. The method of claim 1, wherein said three-dimensional model, said markup tag and a plurality of images for display as said second view are stored in a database accessed by a plurality of distributed users, and user access to said database is controlled with reference to a user access authorization level including a first access level that allows a user to only view a markup tag conveyed to said second view, a second level that allows a user to only view and edit a markup tag by adding user-defined information to a markup tag conveyed to said second view, and a third level that allows a user to view and edit a markup tag by adding and/or deleting user-defined information to and from a markup tag conveyed to said second view.

13. The method of claim 1, wherein said second view comprises a scanned two-dimensional image.

14. A system for interactive virtual inspection of modeled objects comprising:
- a processor;
- a display device coupled to said processor;
- a memory device; and
- program code resident in said memory device, said program code executable by said processor to run a graphic user interface (GUI) for analyzing modeled objects comprising:
  - an acquisition module configured to acquire a three-dimensional model of a modeled object;
  - a searchable database to store a plurality of views of said modeled object;
  - a display module configured to display views of said modeled object on said display, wherein a user interacting with said graphic user interface selects a first view of said modeled object for viewing on said display;
  - a processing module configured to identify a location of interest at a location on a surface of said modeled object that is visible within said first view and to designate global coordinate points of said three-dimensional model that characterize said location of interest at said location on said modeled object; and
  - an inspection module configured to create a markup tag, wherein said user interacts with said markup tag to provide inspection information that annotates said location of interest, wherein said processing module associates said markup tag with said designated global coordinate points at said location on said three-dimensional model; wherein
    - upon said user selecting a second view of said modeled object that has at least one image point visible in said second view that correlates to a corresponding designated global coordinate point of said three-dimensional model that characterize said location of interest for display by said display module, said processing module conveys said markup tag so that said user may also view said information included in said markup tag, said selecting a second view comprising:
    - conveying search criteria as a query to said database;
    - displaying in a thumbnail window of a display thumbnail views from said database corresponding to said search criteria and including information from one or more markup tags; and
    - designating one or more of said thumbnail views for display in a main window of said display as a full size high resolution view including information from said markup tag; and
    - wherein said user interacts with said markup tag in said second view to edit said markup tag such that inspection information is added to and/or deleted from said markup tag and said processing module associates the markup tag with edited inspection information with said global coordinate points at said location on said three-dimensional model that may be displayed on said display module in at least one other view of said modeled object.

15. The system of claim 14, wherein said display module further comprises a mode window and a search dialog for operating with said acquisition module to convey search criteria as a query to said database.

16. The system of claim 15, wherein said display module further comprises a thumbnail window for operating with said acquisition module to display a plurality of thumbnail views retrieved from said database in response to said query to said database and a main window for displaying one or more full size high resolution views including information from said markup tag.

17. The system of claim 14, including a visualization module operating with a visualization control in said display module for a user to select markup tag properties to be displayed with said second view including a dialog box for selecting criteria comprising markup type and/or defect type.

18. The system of claim 14, wherein said inspection module operates with said display module to display a markup dialog for a user to enter descriptions of said location of interest including markup type and defect type.

19. The system of claim 14, including a database storing said three-dimensional model, said markup tag and a plurality of images for display as said second view, and including a security module operable to control access to said database based on different levels of user access authorization including a first access level that allows a user to only view said markup tag conveyed to said second view, a second level that allows a user to only view and add user-defined information to said markup tag conveyed to said second view, and a third level that allows a user to view, add and/or delete user-defined information to and from said markup tag conveyed to said second view.

* * * * *